US009483526B2

(12) United States Patent
Nahm

(10) Patent No.: US 9,483,526 B2
(45) Date of Patent: Nov. 1, 2016

(54) AUTOMATICALLY SUBSCRIBING USERS OF AN ENTERPRISE NETWORK TO A RECORD

(71) Applicant: salesforce.com, inc., San Francisco, CA (US)

(72) Inventor: Stephen Xavier Nahm, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 295 days.

(21) Appl. No.: 14/221,678

(22) Filed: Mar. 21, 2014

(65) Prior Publication Data
US 2014/0289272 A1  Sep. 25, 2014

Related U.S. Application Data

(60) Provisional application No. 61/804,082, filed on Mar. 21, 2013.

(51) Int. Cl.
*G06F 7/00* (2006.01)
*G06F 17/30* (2006.01)

(52) U.S. Cl.
CPC ............... *G06F 17/30477* (2013.01)

(58) Field of Classification Search
CPC ................................ G06F 17/30368
USPC .......................................... 707/769
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Binh V Ho
(74) *Attorney, Agent, or Firm* — Weaver Austin Villeneuve & Sampson LLP

(57) ABSTRACT

Various implementations are directed to systems, apparatus, computer-implemented methods and storage media for detecting a change in a status of a record and, in response to the detection of the change in status, identifying related users that are currently relevant to the record based on the change in the status. The identified users are subscribed to the record, and as a result, communications generated for the record are distributed to them. In some implementations, currently relevant users are users that have a role in developing, working with or supervising the record in the record's current status, or a role in transitioning the record from its current status to another status. It can be desirable to subscribe currently relevant users because the distribution of communications concerning the record in its current status to these users can benefit an enterprise by virtue of these users knowing the information in the communications.

22 Claims, 11 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0243871 A1* | 10/2008 | Anand ............... G06F 17/3089 |
| 2008/0249972 A1 | 10/2008 | Dillon |

(56) References Cited

U.S. PATENT DOCUMENTS

| | | | |
|---|---|---|---|
| 2009/0024704 A1* | 1/2009 | Willems | G06Q 10/00 709/205 |
| 2009/0063415 A1 | 3/2009 | Chatfield et al. | |
| 2009/0100342 A1 | 4/2009 | Jakobson | |
| 2009/0106155 A1* | 4/2009 | Castellanos | G06F 17/30011 705/51 |
| 2009/0177744 A1 | 7/2009 | Marlow et al. | |
| 2011/0184949 A1* | 7/2011 | Luo | G06F 17/30265 707/737 |
| 2011/0213797 A1* | 9/2011 | Hess | G06F 21/6218 707/769 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0079038 A1* | 3/2012 | Hersh | H04M 1/72552 709/206 |
| 2012/0233137 A1 | 9/2012 | Jakobson et al. | |
| 2012/0290407 A1 | 11/2012 | Hubbard et al. | |
| 2013/0073605 A1* | 3/2013 | Fosburgh | G06F 11/3013 709/202 |
| 2013/0091149 A1* | 4/2013 | Dunn | G06F 17/3053 707/749 |
| 2013/0212497 A1 | 8/2013 | Zelenko et al. | |
| 2013/0218884 A1* | 8/2013 | McConnell | G06F 17/30864 707/728 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0129661 A1* | 5/2014 | Thyagaraja | G06F 9/542 709/207 |
| 2014/0337436 A1* | 11/2014 | Hoagland | G06F 17/30867 709/204 |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |

* cited by examiner

AUTOMATICALLY SUBSCRIBING USERS OF AN ENTERPRISE NETWORK TO A RECORD

PRIORITY DATA

This patent document claims priority to co-pending and commonly assigned U.S. Provisional Patent Application No. 61/804,082, titled "Selective Association of Users to Objects in a Collaborative Communication System", by Nahm, filed on Mar. 21, 2013, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to automatically subscribing or unsubscribing users of an enterprise network to and from a record, respectively, and more specifically, to automatically subscribing or unsubscribing the users based on a change in a status of the record.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 5 shows an example of a group feed on a group page according to some implementations.

FIG. 6 shows an example of a record feed including a feed tracked update, a post, and comments according to some implementations.

DETAILED DESCRIPTION

Figure 1A:
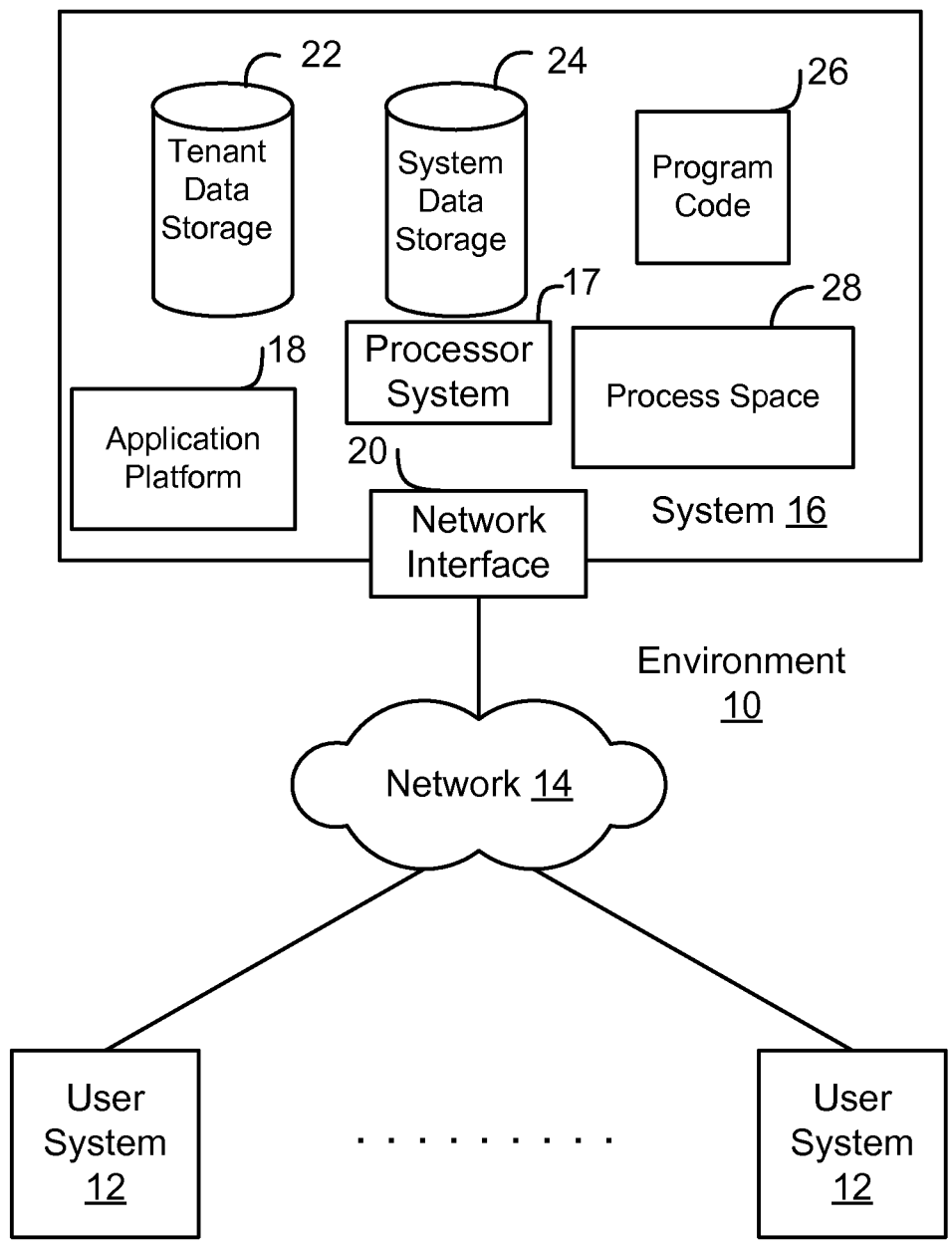
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Various implementations described and referenced herein are directed to systems, apparatus, computer-implemented methods and computer-readable storage media for automatically subscribing or unsubscribing users of an enterprise network to and from a record, respectively. Various implementations more specifically are directed to systems, apparatus, computer-implemented methods and computer-readable storage media for automatically subscribing or unsubscribing the users based on a change in a state or status of the record. In some implementations, communications of information of or about the record are automatically distributed to the subscribed users. In some implementations, the users that are automatically subscribed to the record are users that have a role in developing or working with the record in the record's current status, or a role in transitioning the record from its current status to another status.

For example, in some such implementations, the record may be associated with a development process or workflow having multiple stages. For example, the development process may include an initial stage in which the record has an initial status, a final or completed stage in which the record has a final or completed status, as well as various intermediate stages in which the record has respective intermediate statuses. In such implementations, it can be desirable for different users to be subscribed to the record to receive updates or notifications concerning the record at the different stages of the development process. For example, some users may have active roles in developing the record (or what the record represents) during one stage but may have no part in developing the record at other stages.

As a more specific example, consider a record that is created to represent a business opportunity such as a potential sales deal. The record for the business opportunity may initially have, for example, a "prospective" status. While the record is in the prospective status, certain users are automatically subscribed to the record, such as those assigned to do preliminary research on the potential buyer or those assigned to "cold call" a representative of the buyer. Because these users are subscribed to the record, communications of updates, notifications, or other information about the record are automatically distributed to these users thus facilitating communication and collaboration among them. After this initial period, the record may be assigned to, for example, a "preliminary" status. In response to the transition from the prospective status to the preliminary status, some or all of the previously subscribed users may automatically be unsubscribed (for example, because their services relating to that record are no longer needed or useful to the enterprise), while other users may now automatically be subscribed to the record. For example, while the record is in the preliminary status, certain subscribed users may perform additional research on the buyer, other subscribed users may start preliminary negotiations with the buyer, while still other subscribed users may start working out logistics for designing or distributing a sales package to the buyer. Again, because these users are subscribed to the record, communications of updates, notifications, or other information about the record are automatically distributed to these users thus facilitating communication and collaboration among them.

After this period, the record may be assigned to, for example, an "active" status. In response to the transition from the preliminary status to the active status, some or all of the previously subscribed users may automatically be unsubscribed, while other users may now automatically be subscribed to the record. For example, while the record is in the active status, certain other users may be subscribed such as, for example, legal counsel, marketing team members, or technology specialists. As another example, the record may be assigned to, for example, an "elevated" status in which some or all of these users may automatically be unsubscribed while other users, such as managers or executives, may automatically be subscribed to the record. As another example, the record may then be assigned to an "approved" status or a "rejected" status depending on whether the managers or executives or other users assigned to review the deal determine to approve or to reject the deal, respectively.

In some other implementations, the record may be associated with an account, a client, an application, a service or other permanent (or relatively permanent) entity, fixture or feature of the enterprise. Consider an example in which a record is associated with an account, such as a business account for a regular buyer of products or services produced or offered by the enterprise. In some implementations, the record may have a "normal," "default" or "green" status that indicates, for example, that the buyer is current with its payments to the enterprise. In some such implementations, a regular group of users of an enterprise network may be subscribed to the account record. For example, the regular group of subscribed users can include an account representative, a technical support specialist, an accountant, among other appropriate users that may share relevant information concerning the normal, typical or "day-to-day" operations of the account. However, if the buyer becomes delinquent in its payments, the status of the account record can automatically be changed to an "elevated" or "red" status or otherwise indicate the delinquency or that extra or special attention is needed. In response to the change in status, a manager or higher level member of the enterprise can automatically be subscribed to the record. For example, the manager may be useful in organizing or supervising subordinate subscribed users in acting to recover the payments owed. Thus, in some implementations, the state of a record may be binary; that is, the state of the record may either indicate an actionable status (for example, such that a manager becomes subscribed or so other users are subscribed that need to take action) or a non-actionable status (for example, reflecting a normal status in which only a regular group of users are subscribed to the record or no users are subscribed to the record). Continuing the account example, in some other implementations, if the account becomes delinquent for a time longer than, for example, a predetermined threshold, then the state of the account can automatically be changed to reflect an even greater degree of delinquency, alarm or emergency, and, consequently, additional users (for example, a higher level manager, department head or executive) can automatically be subscribed to the account record. In some such implementations, when all or a portion of the delinquent payments are received, the state of the account record can be changed to reflect a lower level alert status (for example, a "yellow" status or a "watchlist" status) or back to the normal, default or green status.

As described above, in some implementations, the users that are automatically subscribed to a given record while the record is in a given status can have a task-based, managerial, supervisory, advisory, or authorizing association with the record. As an example of a task-based association, a subscribed user may be a sales team member assigned to do research on a buyer or a user assigned to call a representative of the buyer as described above. As another example of a task-based association, a subscribed user may be an engineer assigned to correct a defect in an application offered by or through an enterprise network. Examples of subscribed users that have managerial or supervisory associations with a record include managers and supervisors. As an example of an advisory association, a subscribed user may be a member of the legal counsel of an enterprise. As an example of an authorizing association, a subscribed user may be an executive or other user assigned to approve a deal, product, software release, or other endeavor or operation of an enterprise.

Thus, various implementations are directed to automatically subscribing users of an enterprise network to a record such that the subscribed users receive and can share relevant information concerning the record and, in various implementations, facilitate the resolution of a problem, facilitate the closing of a deal, facilitate the success of an opportunity, or facilitate some other endeavor or operation of an enterprise. Various implementations are more particularly directed to automatically subscribing or unsubscribing users to and from a record in response to a change in the status of the record. In some implementations, the change in the status of the record is determined based on a change in the state of a state field in the data object for the record. In some implementations, the users that are subscribed or unsubscribed to or from a record are determined based on a contextual nature of the state or status. In other words, in such implementations, the users that are automatically subscribed to a record are subscribed not only based on a change in state but also based on the particular state the state field is changed to. Similarly, in some such implementations, the users that are automatically unsubscribed from a record are unsubscribed not only based on a change in state but also based on the particular state the state field is changed to or the state the state field is changed from.

By way of background, conventional distribution models for communicating information to users of computing systems and networks include two general categories. The first is a "pull" model. In a conventional example of a pull model, a user can request to receive communications over a data network that include information from or about certain other users, groups, records or other data objects. The second distribution model is a "push" model. In a conventional example of a push model, an enterprise or the enterprise's agents (for example, a manager) may identify and target particular groups of enterprise users to receive communications based on a hierarchical role model (for example, all employees, all employees of a particular division, or all employees of a particular department or group).

An increasing challenge as the use of electronic communication becomes more widespread and frequent, especially for enterprises with numerous enterprise users, is how to efficiently distribute communications that include enterprise-related information relevant to the respective enterprise users receiving the communications, while not distributing such communications to enterprise users for which the information is not relevant. For example, it can be desirable from an enterprise's perspective to automatically subscribe and distribute communications to a targeted set of relevant enterprise users in response to status changes of a record because, in such situations, the distribution of the communications to such relevant enterprise users would benefit the enterprise by virtue of these relevant enterprise users having knowledge of the information contained in the communications. However, to reduce the likelihood that relevant communications are filtered, ignored, missed, not read or are deleted by enterprise users before reading, it is desirable to limit the number of irrelevant communications the enterprise users receive. Thus, users who no longer have a necessary or useful role in the development or maintenance of the record can automatically be unsubscribed from the record.

Similarly, in enterprise social networks, enterprise users who are inundated with a large number of, for example, irrelevant enterprise-related feed items in their respective enterprise news feeds may actually lose interest in the feeds or perhaps not see or recognize important or otherwise relevant enterprise-related information contained in a particular feed item. For example, a relevant enterprise-related feed item may be virtually "lost" or "buried" in a plethora of irrelevant feed items.

Deterministic routing algorithms have been used to facilitate the distribution of information. But deterministic routing algorithms can have severe drawbacks, especially for enterprise social network feeds. For example, if the routing of feed items is deterministic based on the respective sources of the information in the feed items, for example, based on the users, groups, records or other data objects the user actively subscribes to, then the onus is essentially on the enterprise user to find, identify and subscribe to all sources of potentially relevant information. However, many enterprise users often don't know, for example, which groups to subscribe to or which records to follow, or may not care—at least enough to find and identify such groups or records.

Similarly, it has been observed that many enterprise users won't actively subscribe to notifications or communications related to information that is important or otherwise relevant from the enterprise's perspective, such as those communications that would benefit the enterprise by virtue of the enterprise users knowing the information, but uninteresting from the user's perspective, such as, for example, software update notifications. Rather, or instead, enterprise users are typically more interested in information that is useful or advantageous to them from a more personal or social perspective, and so, generally subscribe only to, or mostly to, groups for which they may receive communications involving or pertaining to such information. As such, in enterprise social networks, it is suboptimal from the enterprise's perspective if the only information that is distributed to employees is information that the employees have actively subscribed to or explicitly stated they are interested in or find useful; because the likely result is that many enterprise users would miss relevant communications. Such relevant communications may include, for example, important updates or notifications concerning emergency releases of software or executable code (for example, a "patch" to fix a bug or defect), sales or business opportunities, critical legal or managerial announcements, and notices of various levels of delinquency (for example, for a task, assignment, or account payment).

Similarly, if the onus is on the enterprise's management to determine which enterprise users or groups of users need to receive particular communications containing important or otherwise relevant enterprise-related information, then the management would conventionally have to identify which users should or need to see the information while not including other users that do not need to or should not see the information because, for example, the viewing or knowing of such information by the latter users would provide no benefit to the enterprise and likely no benefit to the users either. That is, as described above, if management is overly inclusive and distributes too many irrelevant communications to irrelevant enterprise users, they risk desensitizing the currently irrelevant enterprise users from future communications that such enterprise users would find relevant, and resulting in some of such desensitized enterprise users missing potentially critical or advantageous information, especially from the enterprise's perspective, in the future communications.

For example, typical enterprise social network news feeds are different from typical consumer-facing social network news feeds (for example, Facebook®) in many ways, including in the way they prioritize information. In consumer-facing social networks, the focus is generally on helping the social network users find information that they are interested in and excited about. But in enterprise social network applications, as described above, it can be desirable from an enterprise's perspective to distribute communications to a targeted set of relevant enterprise users in situations in which the distribution of the communications to such enterprise users would benefit the enterprise by virtue of these enterprise users knowing the information contained in the communications. Thus, the meaning of relevance differs significantly in the context of a consumer-facing social network as compared with an employee-facing or organization member-facing enterprise social network.

As briefly described above, various implementations described or referenced herein relate generally to automatically subscribing or unsubscribing users of an enterprise network to or from a record based on a change in the state or status of the record to facilitate the communication of relevant enterprise-related information to the subscribed users, as well as, in some instances, to facilitate collaboration among the subscribed users. As used herein, relevant enterprise-related information refers to information that would be predicted or expected to benefit the enterprise by virtue of the recipients knowing the information. As described above, relevant enterprise-related information, although benefiting the enterprise, may also benefit the user as well. Additionally, as used herein, an enterprise network can refer to virtually any type of enterprise electronic communication system. For example, an enterprise network can refer to an email system as well to an enterprise social network (for example, Chatter®) as described in more detail below.

In some implementations, the users described herein are users (or "members") of an interactive online enterprise "social" network, also referred to herein as an "enterprise social networking system," and more simply as an "enterprise network." Such online enterprise social networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or enterprise social networking systems.

Some online enterprise social networks can be implemented in various settings, including business and organizations. For instance, an online enterprise social network can be implemented to connect users within an enterprise such as a business corporation, partnership or organization, or a group of users within such an enterprise. For instance, Chatter® can be used by employee users in a division of a business organization to share data, communicate, and collaborate with each other for various enterprise-related purposes. In the example of a multi-tenant database system, each organization or group within the organization can be a respective tenant of the system, as described in greater detail below.

In some online enterprise social networks, users can access one or more enterprise network feeds, which include information updates presented as items or entries in the feed. Such a feed item can include a single information update or a collection of individual information updates. A feed item can include various types of data including character-based data, audio data, image data and/or video data. A network feed can be displayed in a graphical user interface (GUI) on a display device such as the display of a computing device as described below. The information updates can include various enterprise social network data from various sources and can be stored in an on-demand database service environment. In some implementations, the disclosed methods, apparatus, systems, and computer-readable storage media may be configured or designed for use in a multi-tenant database environment.

In some implementations, an online enterprise social network may allow a user to follow (or "subscribe to") data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's profile status, uploaded files, and user-submitted hyperlinks to enterprise social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some online enterprise social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal network page. One implementation of such a personal network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a network feed displayed on the user's profile page.

In some implementations, a network feed may be specific to a group of enterprise users of an online enterprise social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more enterprise users are submitted to a network feed for a particular user, group, object, or other construct within an online enterprise social network, an email notification or other type of network communication may be transmitted to all users following the user, group, or object in addition to the inclusion of the data as a feed item in one or more feeds, such as a user's profile feed, a news feed, or a record feed. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

In some other implementations, the described enterprise users are not users of an online enterprise social network or social networking system per se. For example, in some other implementations, the enterprise users are simply employees of a business corporation or partnership or are members of an organization that does not have its own social networking system or which does not utilize the services of a third party social network service provider. Such business enterprises and other organizations often use email as their sole or primary means of communicating information to employee users and member users. However, in at least some of the implementations described below, it is contemplated that business enterprises or other organizations could additionally or alternatively use other means of electronic communication, such as, for example, Short Message Service (SMS) messages, Multimedia Messaging Service (MMS) messages, or other text or multimedia messages.

The implementations described or referenced above and below as well as other implementations can be embodied in various types of hardware, software, firmware, or combinations thereof. For example, some techniques disclosed herein may be implemented, at least in part, by computer-readable media that include program instructions, state information, etc., for performing various services and operations described herein. Examples of program instructions include both machine- or processor-executable code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different network feeds. A second user following a first user and a record can receive the feed items associated with the first user and the record for display in the second user's news feed, which is another type of network feed. In some implementations, the feed items from any number of followed users and records can be combined into a single network feed of a particular user.

As examples, a feed item can be a message, such as a user-generated post of text data, and a "feed tracked" update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In some other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to the salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Web page content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
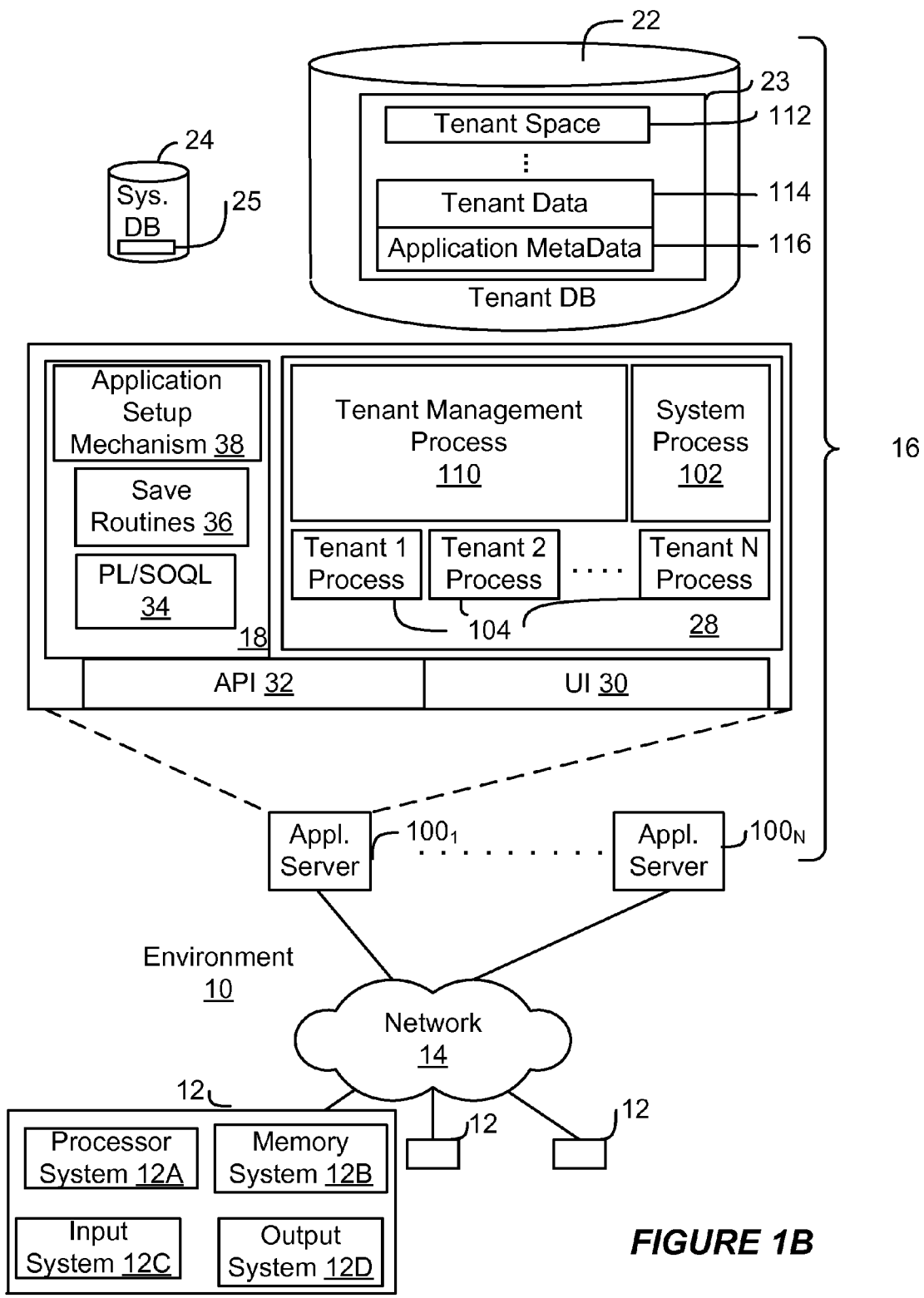
FIG. 1B shows a block diagram of example implementations of elements of FIG. 1A and example interconnections between these elements according to some implementations.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes. Additionally, a machine learning system, as described below with reference to FIGS. 7-10, also may execute on the system 16.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $100_1$-$100_N$, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100, also referred to herein as an "app server", may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
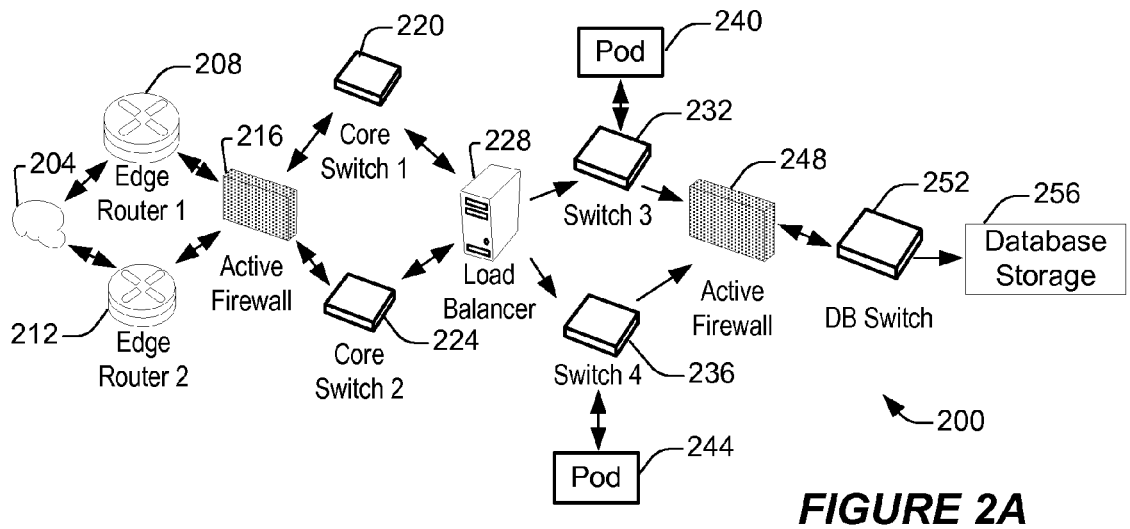
FIG. 2A shows a system diagram of example architectural components of an on-demand database service environment according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
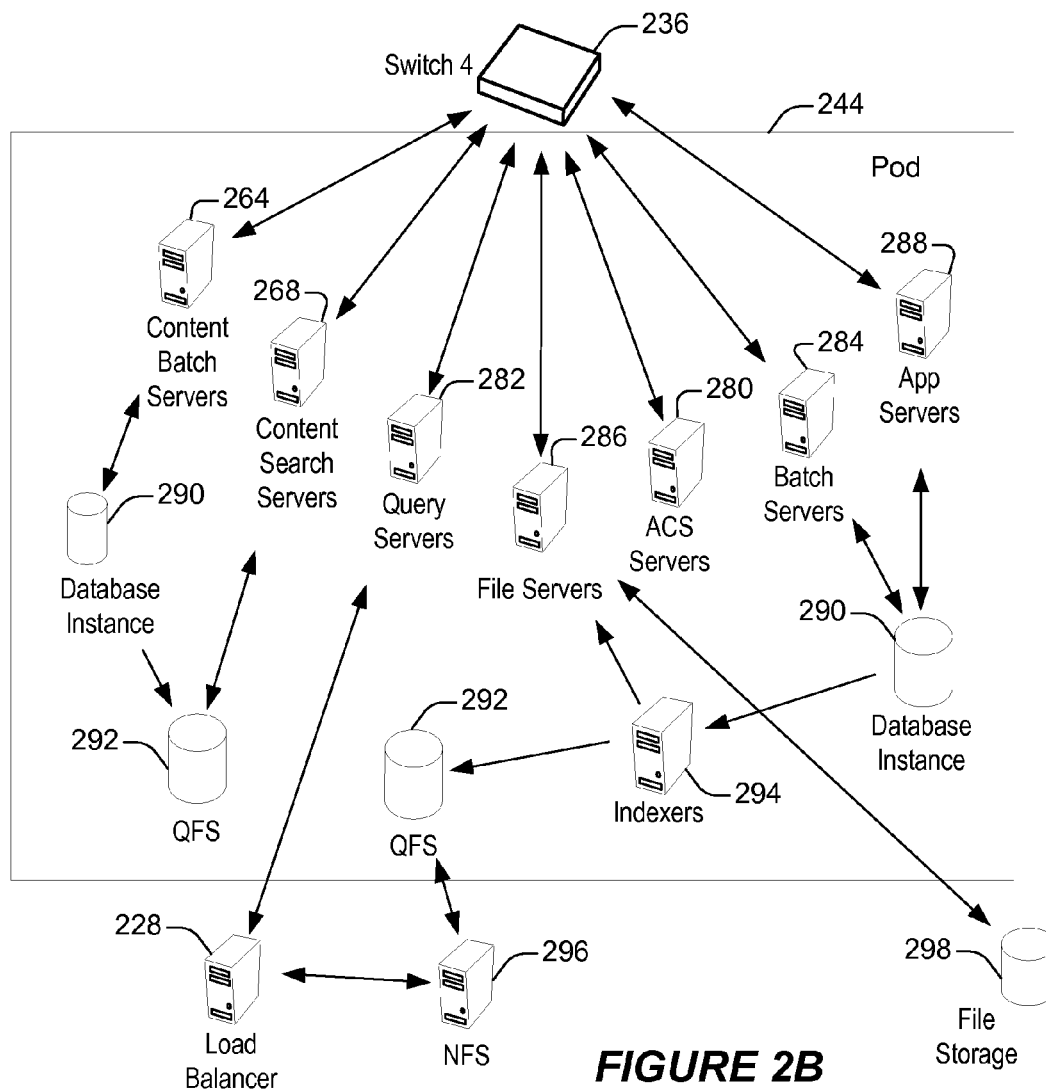
FIG. 2B shows a system diagram further illustrating example architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-10. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know; that is, whose who would find the communication relevant. Accordingly, some implementations of Chatter® can inform others (e.g., co-workers) who want to know about an update to a record automatically.

Figure 3:
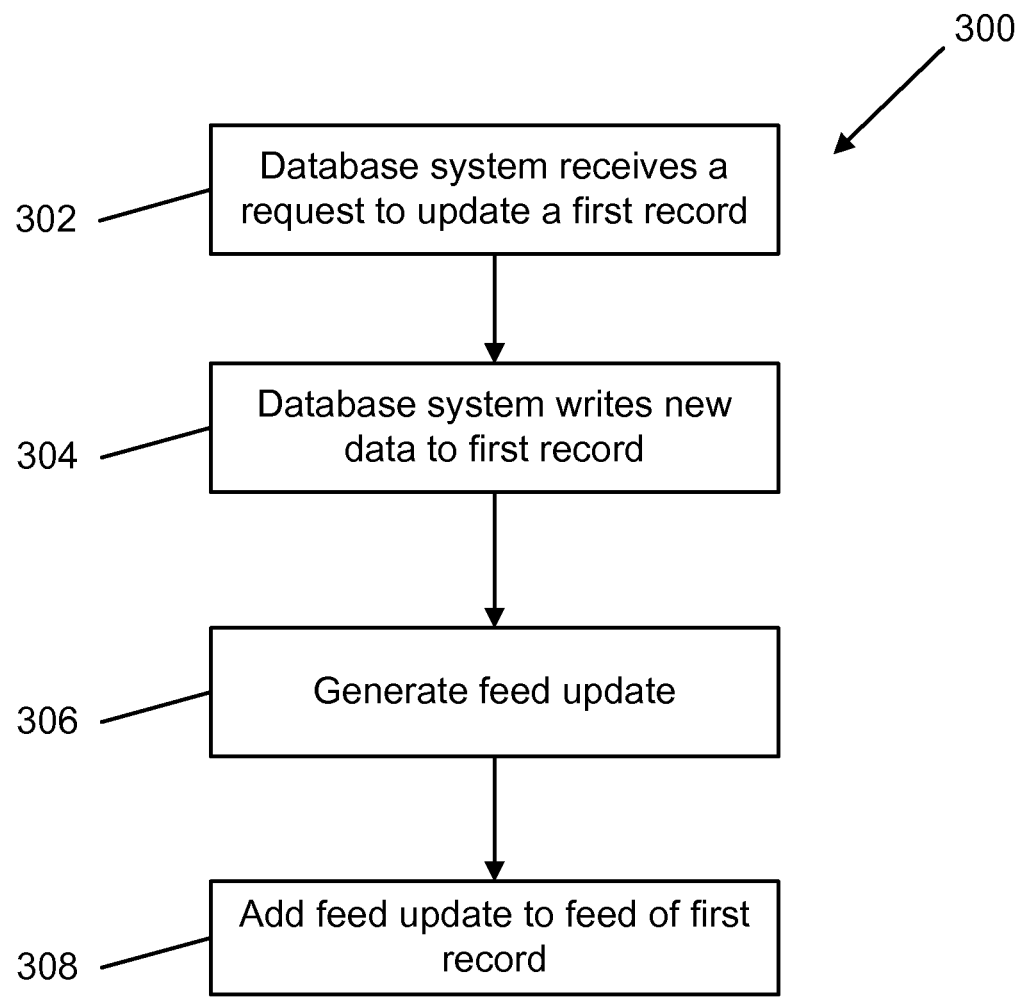
FIG. 3 shows a flowchart of an example method for tracking updates to a record stored in a database system according to some implementations.

FIG. 3 shows a flowchart of an example method 300 for tracking updates to a record stored in a database system according to some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 302, the database system receives a request to update a first record. In some implementations, the request is received from a first user. For example, a user may be accessing a page associated with the first record, and may change a displayed field and "click" save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type or status to another (e.g., converting a lead to an opportunity), closing a record (e.g., a case type record), and potentially any other state or status change of a record—any of which could include a field change associated with the state or status change. Any of these events update the record whether by changing a field of the record, a state of the record, or some other characteristic or property of the record. In some implementations, a list of supported events for creating a feed tracked update can be maintained within the database system, e.g., at a server or in a database.

In block 304, the database system writes new data to the first record. In some implementations, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 306, a feed tracked update is generated about the update to the record. In some implementations, the feed tracked update is created in parts for assembling later into a display version. For example, event entries can be created and tracked in a first table, and changed field entries can be tracked in another table that is cross-referenced with the first table. In another implementation, the feed tracked update is automatically generated by the database system. The feed tracked update can convey in words that the first record has been updated and provide details about what was updated in the record and who performed the update. In some implementations, a feed tracked update is generated for only certain types of events and/or updates associated with the first record.

In block 308, the feed tracked update is added to a feed for the first record. In some implementations, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, in some cases a feed may be maintained for only certain records. In some implementations, the feed of a record can be stored in the database associated with the record. For example, the feed can be stored as a field (e.g., as a child object) of the record. Such a field can store a pointer to the text to be displayed for the feed tracked update.

IV. Tracking Actions of a User

In addition to knowing about events associated with a particular record, it can be helpful for a user to know what a particular user is doing. In particular, it might be desirable or convenient to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 4:
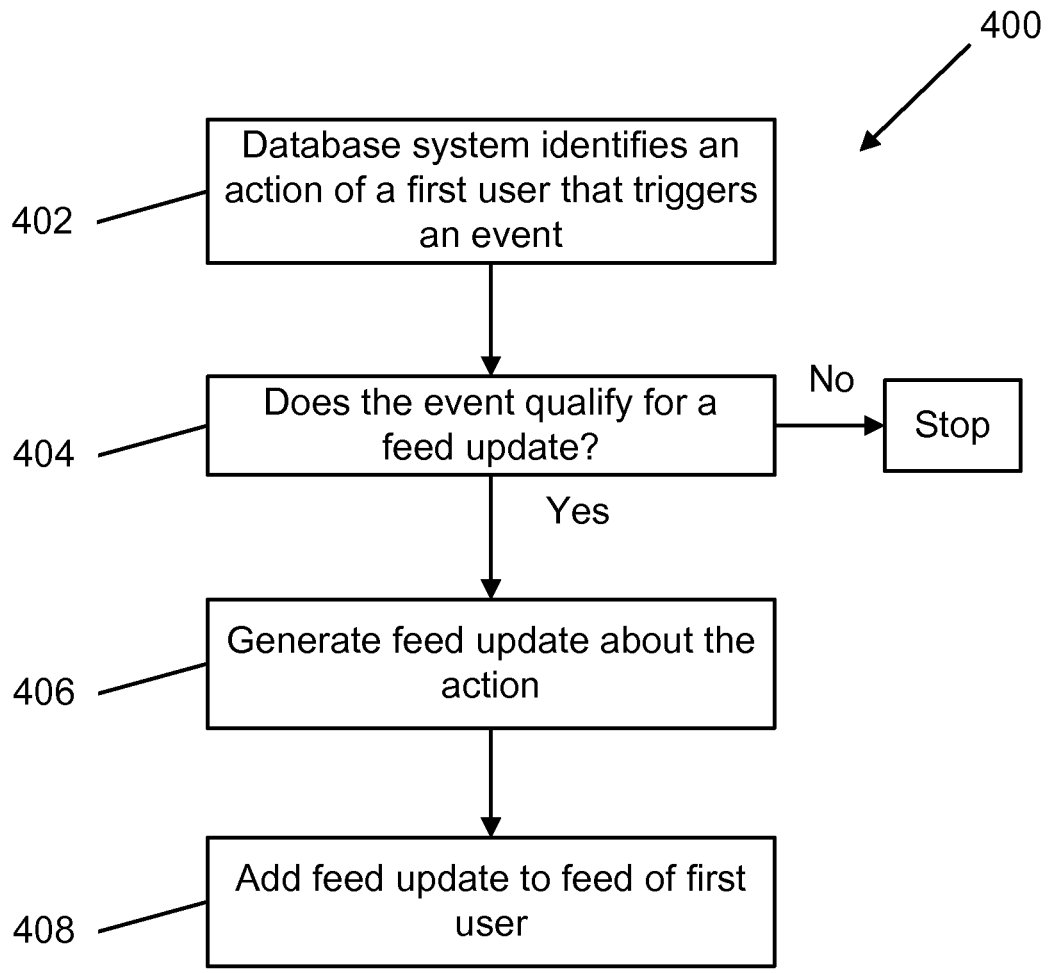
FIG. 4 shows a flowchart of an example method for tracking actions of a user of a database system according to some implementations.

FIG. 4 shows a flowchart of an example method 400 for tracking actions of a user of a database system according to some implementations. The method 400 may be performed in addition to the method 300. The operations of the method 300, including order of blocks, can be performed in conjunction with the method 400 and other methods described herein. Thus, a feed can be composed of changes to a record and actions of users.

In block 402, a database system (e.g., 16 of FIGS. 1A and 1B) identifies an action of a first user. In some implementations, the action triggers an event, and the event is identified. For example, the action of a user requesting an update to a record can be identified, where the event is receiving a request or is the resulting update of a record. The action may thus be defined by the resulting event. In some implementations, only certain types of actions (events) are identified. Which actions are identified can be set as a default or can be configurable by a tenant, or even configurable at a user level. In this way, processing effort can be reduced since only some actions are identified.

In block 404, the system determines whether the event qualifies for a feed tracked update. For example, a predefined list of events (e.g., as mentioned herein) can be created so that only certain actions are identified. As another example, an administrator (or other user) of a tenant can specify the type of actions (events) for which a feed tracked update is to be generated. This block may also be performed for the method 300.

In block 406, a feed tracked update is generated about the action. In an example where the action is an update of a record, the feed tracked update can be similar to or the same as the feed tracked update created for the record. The description can be altered to focus on the user as opposed to the record. For example, "John D. has closed a new opportunity for account XYZ" as opposed to "an opportunity has been closed for account XYZ." In block 408, the feed tracked update is added to a news feed of the first user.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

In some implementations, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In some implementations, feed tracked updates can be generic containers with formatting restrictions, As an example of a feed tracked update for a creation of a new record, "Mark Abramowitz created a new Opportunity for IBM—20,000 laptops with Amount as $3.5 M and Sam Palmisano as Decision Maker." This event can be posted to the profile feed for Mark Abramowitz and the entity feed for the record of Opportunity for IBM—20,000 laptops. The pattern can be given by (AgentFullName) created a new (ObjectName)(RecordName) with [(FieldName) as (FieldValue) [,/and]]*[[added/changed/removed] (RelatedListRecordName) [as/to/as] (RelatedListRecordValue) [,/and]]*. Similar patterns can be formed for a changed field (standard or custom) and an added child record to a related list.

VI. Tracking Commentary from or about a User

As described above, in some implementations, a user can submit user-generated messages including text, instead of or in addition to the database system generating a feed tracked update. As the text is submitted as part or all of a message by a user, the text can be about any topic. Thus, more information than just actions of a user and events of a record can be conveyed. In some implementations, the messages can be used to ask a question about a particular record, and users following the record can provide comments and responses.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects. In some implementations, users can rate feed tracked updates or messages (including comments). The order of the feed items displayed on a particular user's, group's or record's page can chronological or be based on a relevance value or other prioritization scheme, which can be determined by the database system using various factors.

Figure 5:
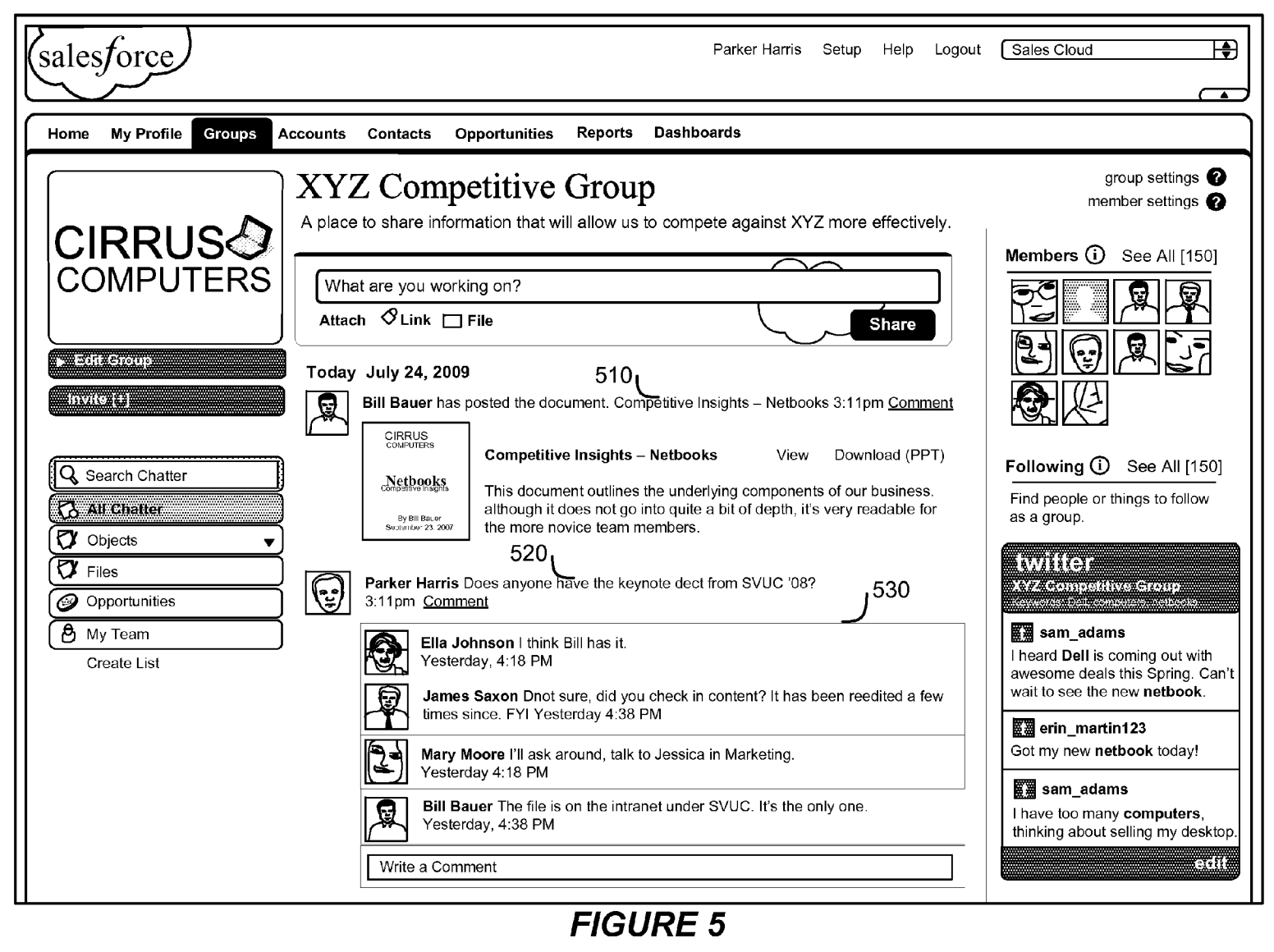

FIG. 5 shows an example of a group feed on a group page according to some implementations. As shown, a feed item 510 shows that a user has posted a document to the group object. The text "Bill Bauer has posted the document Competitive Insights" can be generated by the database system in a similar manner as feed tracked updates about a record being changed. A feed item 520 shows a post to the group, along with comments 630 from Ella Johnson, James Saxon, Mary Moore and Bill Bauer.

Figure 6:
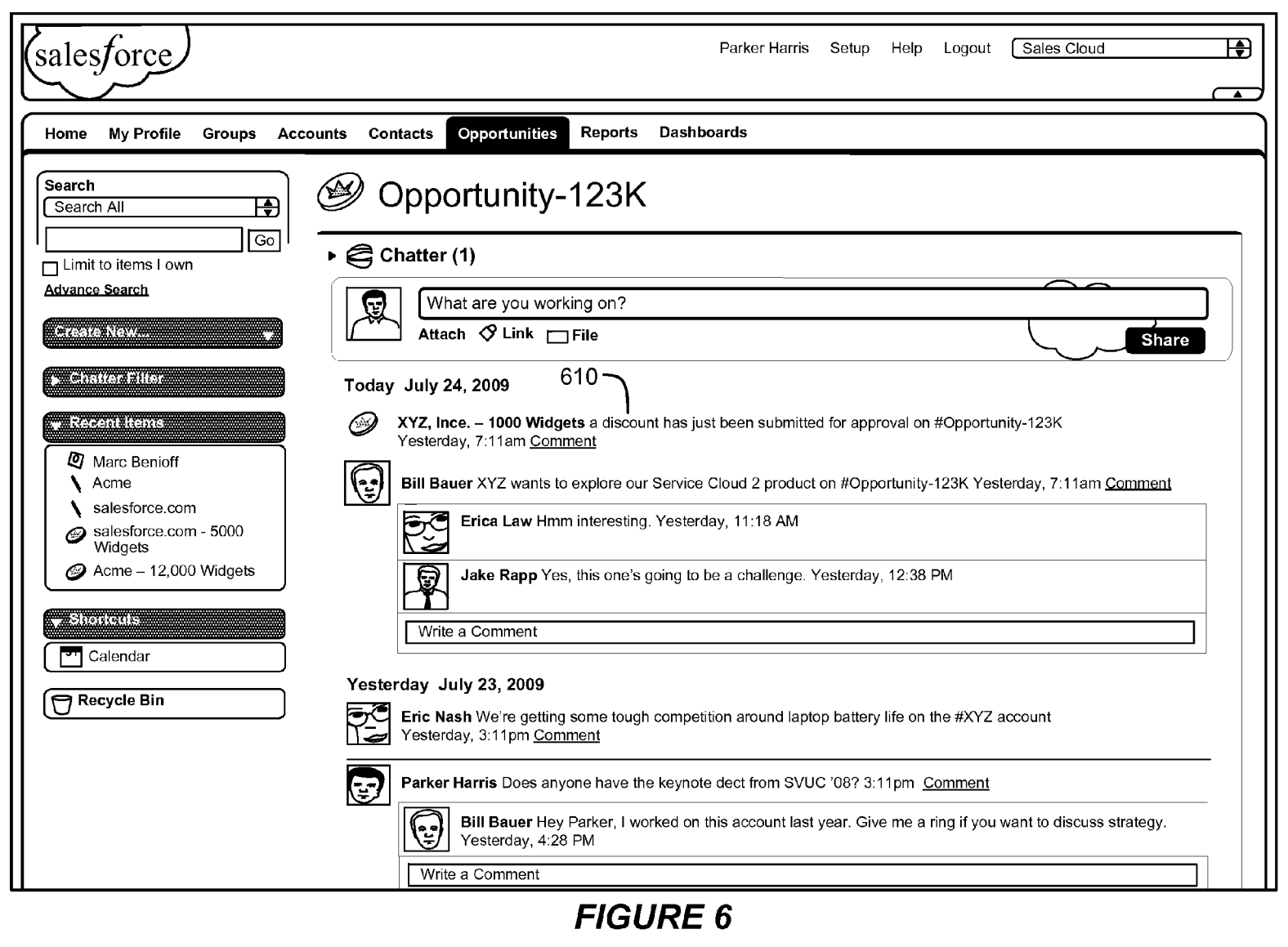

FIG. 6 shows an example of a record feed containing a feed tracked update, post, and comments according to some implementations. Feed item 610 shows a feed tracked update based on the event of submitting a discount for approval. Other feed items show posts, e.g., from Bill Bauer, that are made to the record and comments, e.g., from Erica Law and Jake Rapp, that are made on the posts.

VII. Automatically Subscribing Users to Records

Figure 7:
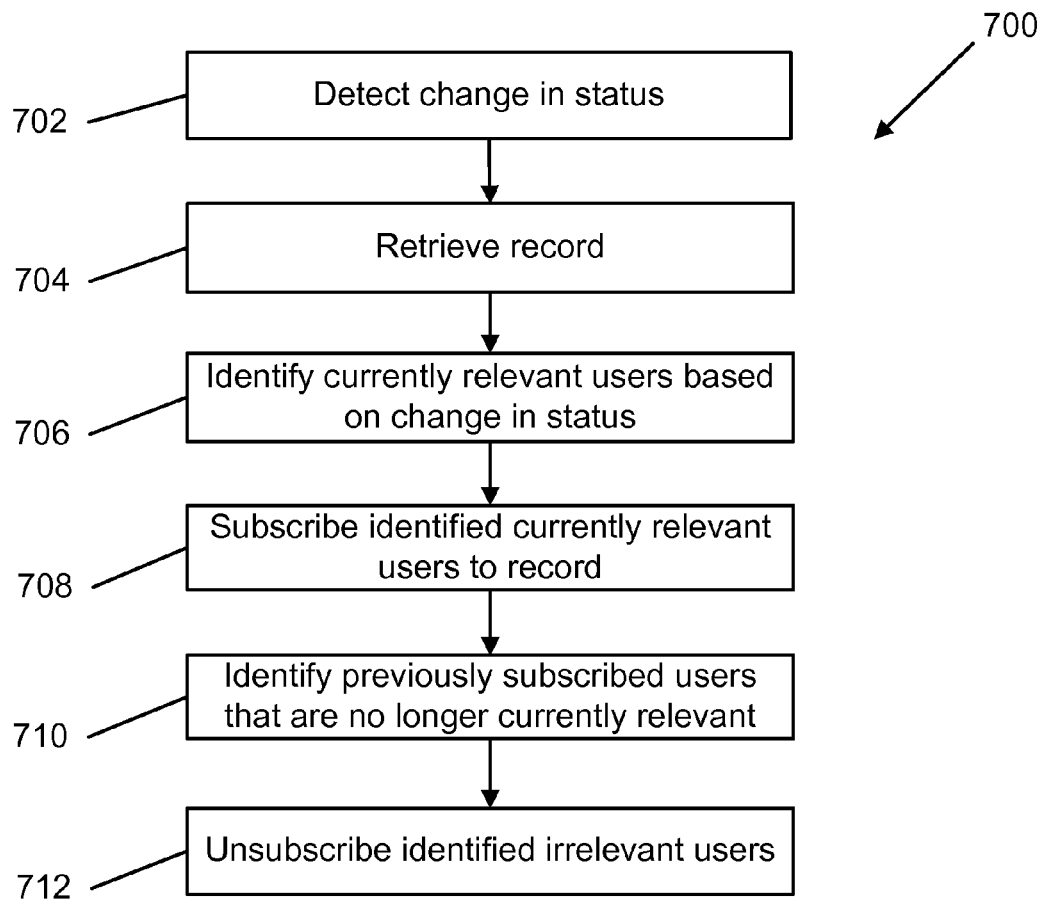
FIG. 7 shows a flowchart of an example computer-implemented method for automatically subscribing users of an enterprise network to a record stored in a database of records.

FIG. 7 shows a flowchart of an example computer-implemented method 700 for automatically subscribing users of an enterprise network to a record. The method 700 can be performed by any suitable computing device, computing system or any number of computing devices or systems (hereinafter collectively referred to as "the system") that may cooperate to perform the method 700. In some implementations, each of the blocks of the method 700 can be performed wholly or partially by the database system 16 of FIGS. 1A and 1B, or other suitable devices or components (including processors) described herein, or the like.

In block 702, the system detects a change in a status of a record. In block 704 the system accesses (or retrieves) the record for which the change in status was detected by the system in block 702. In some implementations, in block 706, the system identifies one or more users in the enterprise network that are currently relevant to the record based on the change in the status. In some implementations, in block 708, the system subscribes each of the one or more identified currently relevant users to the record. In some implementations, in block 710, the system identifies one or more previously subscribed users that are no longer currently relevant (also referred to as "irrelevant users") to the record based on the change in the status. In some such implementations, in block 712, the system unsubscribes each of the one or more identified irrelevant users from the record (it should be appreciated that currently irrelevant users can again become currently relevant based on a subsequent change in status). As described above, currently relevant users are users that have a role in developing, working with or supervising the record in the record's current status, or a role in transitioning the record from its current status to another status. Thus, it is desirable to subscribe currently relevant users because the distribution of communications concerning the record in its current status to the currently relevant users would benefit the enterprise by virtue of these users knowing the information contained in the communications. In contrast, irrelevant users are users that do not currently have a role in developing, working with or supervising the record in the record's current status, and do not have a role in transitioning the record from its current status to another status. Thus, the distribution of communications concerning the record in its current status to the irrelevant users would not provide a benefit, or at least not an appreciable benefit, to the enterprise by virtue of these users knowing the information contained in the communications.

Figure 8:
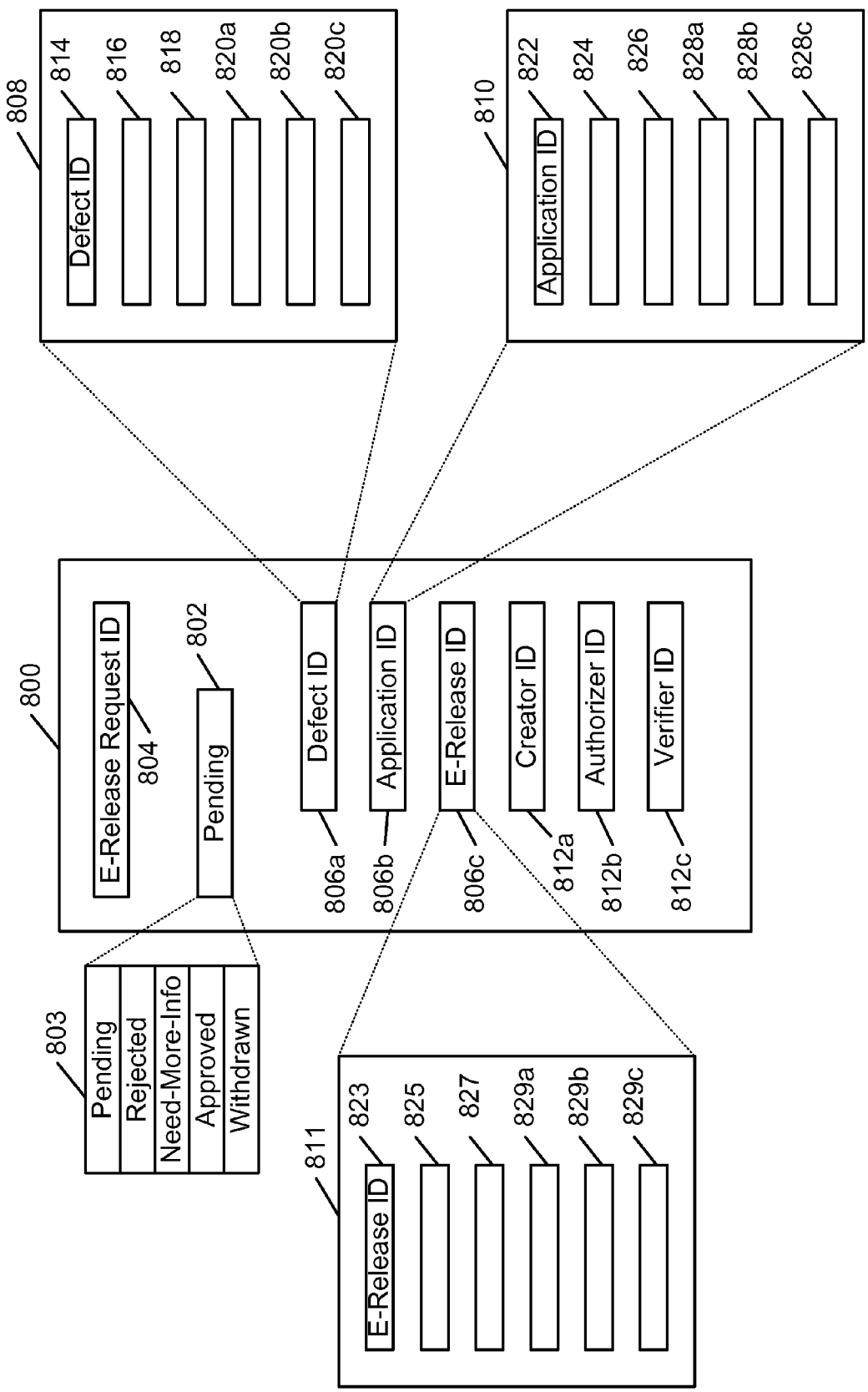
FIG. 8 shows a representation of an example record that can be used in the method of FIG. 7.

For didactic purposes, FIG. 8 shows a representation of an example record 800. As described above, the record can be stored in the database system 16 of FIGS. 1A and 1B and, in some example implementations, in tenant data storage 22 or system data storage 24. Also as described above, each record in the database system can be stored as a respective record data object in the system, and as such, references to a record (such as the record 800) in the following description may more particularly refer to the associated data object storing the record in the system. As shown in FIG. 8, the record 800 includes a number of fields including a state field 802. In various implementations, the state field 802 can have, include, store, be assigned to or be populated with (hereinafter used interchangeably where appropriate) one of two or more possible states or state values (hereinafter referred to simply as "states"). Each of the two or more possible states of the state field 802 represents a respective status of the record 800. The system detects the change in status in block 702 by detecting a change of state in the state field 802.

In some implementations, the record 800 can be an Emergency Release (E-Release) Request Record. Where the record 800 is an E-Release Request record, the E-Release Request record can be linked with an associated E-Release record. The E-Release record can include executable code or software to correct a defect ("bug") in, or to make an improvement in, an application executing or to be executed by the system. For example, the application can be a core application of the database system 16. In some instances, the application can facilitate the provision of on-demand services to client computing systems. However, the application generally can be any application, service or feature provided or facilitated by the system 16.

In some implementations, the state field 802 can be, or can include, a picklist. An expanded view of an example of a picklist 803 also is shown in FIG. 8. In some such implementations, each item in the picklist 803 represents a respective one of the possible states of the state field 802, but only one of the items in the picklist is active or selected at any given time; that is, only one of the states can represent the state field 802 at any given time. For example, a picklist can include any suitable number and combination of states such as, for example, descriptive states including "pending," "rejected," "need more information," "withdrawn," "approved," "successful," "resolved," and "deleted." As another example, a picklist can include color-associated states including "red," "yellow" and "green" representing, for example, various alert levels (such as alert levels associated with an account, an opportunity, a defect, or a client or user that may be lost or who has indicated an intent to end a partnership or relationship with the enterprise or an intent to leave the enterprise network). As another example, a picklist can include priority-associated states including "high," "medium" and "low." In some other implementations, the state field 802 can be a binary field having only two possible states such as, for example, "yes" or "no," "high" or "low," "normal" or "elevated," "active" or "resolved," "actionable" or "non-actionable," and "open" or "closed." The items in the picklist can be stored as child elements of the state field in various implementations.

Figure 9:
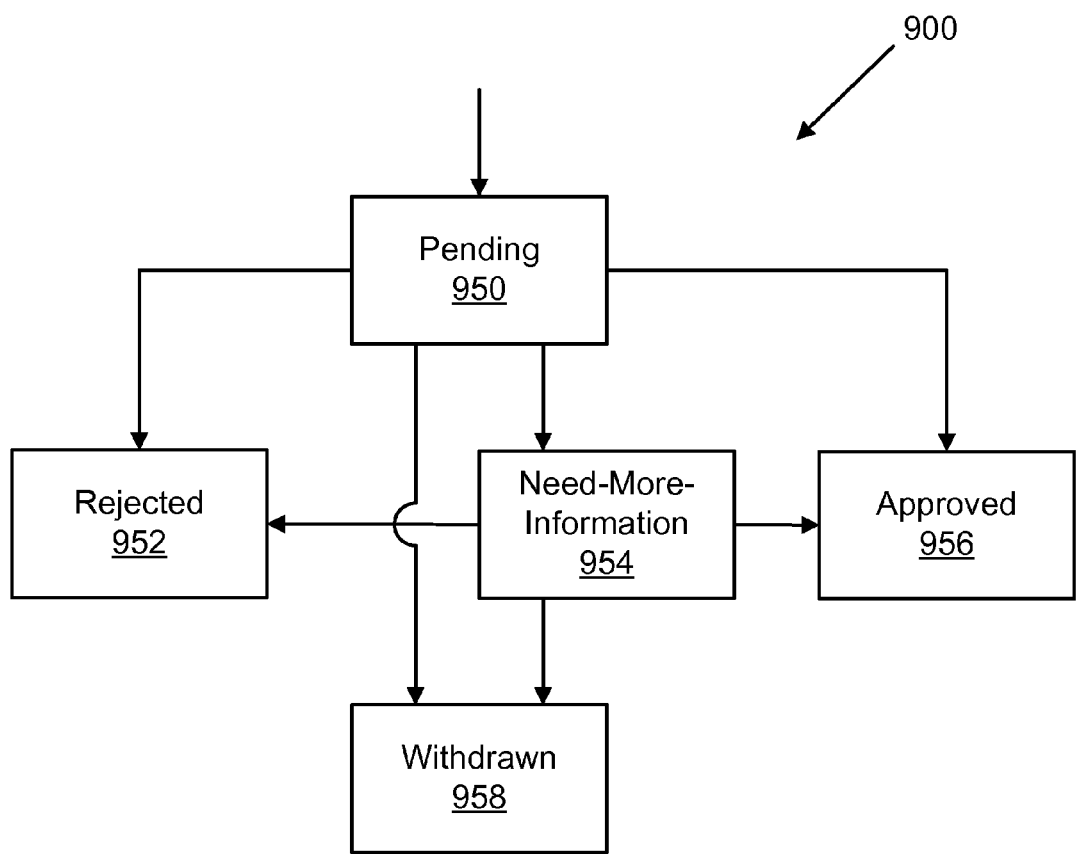
FIG. 9 shows an example state diagram for the possible states of the state field of the record of FIG. 8.

In the illustrated example, the state field 802 includes a picklist 803 that includes five possible states: "Pending," "Rejected," "Need-More-Information," "Withdrawn" and "Approved." FIG. 9 shows an example state diagram 900 for the five possible states of the state field 802 of the record 800. For example, the Pending state 950 can indicate that the status of the record 800 is pending approval. In some implementations, the state field 802 for the record 800, as well as for various other records in the system, can initially be assigned the Pending state 950, for example, when the record 800 is created.

In some implementations, the E-Release Request record 800 can be created in response to an E-Release Request received by the system 16. For example, an E-Release Request may be made to obtain approval to release or execute an associated E-Release in order to correct a defect or to improve an application. For example, the request can be automatically generated in response to the detection of a defect by the system during normal operation or during a diagnostic test. As another example, the request can be submitted by a user, such as an administrator. In some example implementations, an administrator, when creating the record, can select various ones of the fields described herein with reference to FIGS. 7-9. In some such implementations, the administrator also can assign values or states to the fields when initially requesting or creating the record or at other later times (for example, between releases).

Referring back to the state field 802 of FIG. 8 and the state diagram 900 of FIG. 9, in some implementations, the Rejected state 952 indicates that the status of the record 800 is rejected; in the present context, this may indicate that those users responsible for approving or rejecting the E-Release Request have rejected the E-Release Request. In some implementations, the Need-More-Information state 954 indicates that the status of the record 800 is pending the receipt of more information and additional review; in the present context, this may indicate that those users responsible for approving or rejecting the E-Release Request need more information to determine whether to approve or reject the E-Release Request and the associated E-Release. In some implementations, the Approved state 956 indicates that the status of the record 800 is approved; in the present context, this may indicate that those users responsible for approving or rejecting the E-Release Request have approved the E-Release associated with the E-Release Request for execution by the system. In some such implementations, upon the status being updated to the Approved state 956, an E-Release record 811 is created, or, if the E-Release record 811 has already been created, the E-Release record 811 becomes associated with the E-Release Request Record 800. The E-Release record 811 can, for example, contain the executable code, program, or software for implementing the E-Release to, for example, correct or fix a defect or to make an improvement to an application. In some such implementations, the E-Release record 811 is automatically associated with the E-Release Request record 800. In some implementations, the Withdrawn state 958 indicates that the status of the record 800 is withdrawn; in the present context, this may indicate that those users responsible for requesting the E-Release have temporarily or permanently withdrawn their request or otherwise no longer seek to have the E-Release approved.

In various implementations, the possible states of the state field 802 are fixed. In other words, once the system generates the record 800 and the state field 802 within the record, whether automatically or based on input by a user such as an administrator or owner of the record, the possible states of the state field 802 are fixed. However, in some implementations, the system can, for example, in response to a request or an edit made by the owner or other user with access to the record, update the possible states of the state field 802 including the number of states or the values of the states.

In some implementations, the record 802 also includes a record identifier field 804 that identifies the record with a respective record identifier. For example, the respective record identifier can be a string of text, a string of other values or a bitstring (for example, a string of binary bits). In some implementations, the system automatically generates a unique record identifier for each record when the record is created. In the illustrated example, the record identifier for the E-Release Request record 800 is simply, for didactic purposes, "E-Release Request ID."

In various implementations, the record 800 also includes one or more related record fields 806. In some such implementations, each related record field 806 can have one or more record identifiers for one or more respective related records. For example, the record 800 includes three related record fields 806a, 806b and 806c. Continuing the example of an E-Release Request record 800, the first record field 806a can indicate the defect or improvement the associated E-Release is designed to fix or make, respectively. In such implementations, the defect (or improvement) has its own associated record 808 in the database system. Thus, the defect (or improvement) can be assigned a record identifier that uniquely identifies the defect (or improvement). The record identifier for the defect (or improvement) can be assigned to the first record field 806a. For example, the record identifier for the defect (or improvement) can be a string of text, a string of other values or a bitstring. In the illustrated example, the record identifier for the defect (or improvement) is simply, for didactic purposes, "Defect ID."

Continuing the example of an e-release record 800, the second record field 806b can indicate the application having the defect or requiring the improvement the associated E-Release is designed to fix or make, respectively. In such implementations, the application has its own associated record 810 in the database system. Thus, the application can be assigned a record identifier that uniquely identifies the application. The record identifier for the application can be assigned to the second record field 806b. For example, the record identifier for the application can be a string of text, a string of other values or a bitstring. In the illustrated example, the record identifier for the application is simply, for didactic purposes, "Application ID."

Again continuing the example of an e-release record 800, the third record field 806c can indicate the associated E-Release designed to fix the defect or improve the application. In such implementations, the E-Release, as described above, has its own associated record 811 in the database system. Thus, the E-Release can be assigned a record identifier that uniquely identifies the E-Release. The record identifier for the E-Release can be assigned to the third record field 806c. For example, the record identifier for the E-Release can be a string of text, a string of other values or a bitstring. In the illustrated example, the record identifier for the E-Release is simply, for didactic purposes, "E-Release ID." In some implementations or instances, an E-Release and associated E-Release record 811 can be created before the E-Release Request is made or the associated E-Release Request Record 800 is created. In some other implementations or instances, an E-Release and associated E-Release record 811 can be created after the E-Release Request is made or the associated E-Release Request Record 800 is created. In some of these or other implementations, the third record field 806c can be empty or have a null or default value until the E-Release Request status field 802 is in the Approved state 956, upon which the E-Release Record 811 is automatically associated with the E-Release Request Record 800 and the third record field 806c is populated with the E-Release ID.

In some implementations, an administrator can input or select (for example, via a menu or other graphical user interface) the related record identifiers for the related record fields 806a, 806b and 806c. In some other implementations, the system can automatically pull data from other records. For example, when creating an e-release record 800 in response to an e-release request, the system can automatically identify the Defect ID, Application ID or E-Release ID based on information in the e-release request.

As described above, each user of the enterprise network can be associated with a respective user data object in the system. Each user data object can include a user identifier field that identifies the associated user with a respective user identifier. In some implementations, each record 800 further includes one or more related user fields 812. In some such implementations, each related user field 812 can have one or more user identifiers for one or more respective related users of the enterprise network. For example, the record 800 includes three related user fields 812a, 812b and 812c. The first user field 812a can indicate the creator or owner of the record or the user who requested the E-Release (all referred to collectively herein as the "creator"). Continuing the E-Release example, the creator of the E-Release Request record 800 can be the user whose role it is (or was) to oversee the E-Release Request or associated E-Release, or the user who has the first task associated with the development and release of the associated E-Release. In such implementations, the creator has his or her own associated user object in the database system. Thus, the creator can be assigned a user identifier that uniquely identifies the creator. The user identifier for the creator can be assigned to the first user field 808a. For example, the user identifier for the creator can be a string of text, a string of other values or a bitstring. In the illustrated example, the user identifier for the creator is simply, for didactic purposes, "Creator ID." In some implementations, the creator of the record 800 is automatically subscribed to the record when the record is created, for example, when the state field 802 is set to the pending state.

Continuing the example of an E-Release Request record 800, the second user field 812b can indicate a quality assurance (QA) engineer or other authorizer, such as a manager, assigned to authorize or approve the E-Release Request and, consequently, proceed forward with the release of the associated E-Release for inclusion or execution in or by the system. This second related user also has an associated user data object in the database system and is assigned a user identifier. In the illustrated example, the user identifier for the authorizer is simply, for didactic purposes, "Authorizer ID." In some implementations, the authorizer of the record 800 is automatically subscribed to the record when the record is created, for example, when the state field 802 is set to the pending state.

Continuing the example of an E-Release Request record 800, the third user field 812c can indicate a QA engineer or other person assigned to verify that the associated E-Release, after being included in or executed by the system, has fixed the defect or is otherwise working as expected. This third related user also has an associated user data object in the database system and is assigned a user identifier. In the illustrated example, the user identifier for the verifier is simply, for didactic purposes, "Verifier ID."

In some implementations, an administrator can input or select (for example, via a menu or other graphical user interface) the related user identifiers for the related user fields 812a, 812b and 812c. In some other implementations, the system can automatically pull data from other records. For example, when creating an E-Release Request record 800 in response to an E-Release Request, the system can automatically identify the Creator ID, the Authorizer ID and the Verifier ID based on information in the E-Release Request.

Referring back to the Defect record 808, the record 808 includes a record identifier field 814 and a state field 816. The state field 816 for the Defect record 808 also can include a picklist including any suitable number and combination of states such as, for example, the descriptive states, color-associated states, priority-associated states or binary states described above for the picklist 803 and state field 802 described above for the E-Release Request record 800. For example, the state field 816 can track a severity state of the defect or a severity state of a need for an improvement. The Defect record 808 also can include one or more related record fields 818 having respective record identifiers for one or more respective related records. The Defect record 808 also includes one or more related user fields 820 having respective user identifiers for one or more respective related users. For example, the Defect record 808 includes three related user fields 820a, 820b and 820c. The first user field 820a can indicate the creator or owner of the record. The second user field 820a can indicate one or more engineers or computer programmers assigned to fix the defect. The third user field 820a can indicate one or more managers of the engineers or programmers assigned to oversee, approve or verify the fix.

Referring back to the Application record 810, the record 810 includes a record identifier field 822 and a state field 824. The state field 824 for the Application record 810 also can include a picklist including any suitable number and combination of states such as, for example, the descriptive states, color-associated states, priority-associated states or binary states described above for the picklist 803 and state field 802 described above for the E-Release Request record 800. For example, the state field 824 can track the life-cycle phase of the Application (for example, a pre-production state, an active state or a retired state, among other possibilities). The Application record 810 also can include one or more related record fields 826 having respective record identifiers for one or more respective related records. The Application record 810 also includes one or more related user fields 828 having respective user identifiers for one or more respective related users. For example, the Application record 810 includes three related user fields 828a, 828b and 828c. The first user field 828a can indicate the creator or owner of the record. The second user field 828b can indicate one or more engineers or computer programmers assigned to design or maintain the record. The third user field 828c can indicate one or more managers or executives assigned to oversee the application.

Referring back to the E-Release record 811, the record 811 also can include a record identifier field 823 and a state field 825. The state field 825 for the E-Release record 811 also can include a picklist including any suitable number and combination of states such as, for example, the descriptive states, color-associated states, priority-associated states or binary states described above for the picklist 803 and state field 802 described above for the E-Release Request record 800. For example, the state field 825 can track the stage of deployment of the E-Release (for example, an "In development" state, a "Deployment in progress" state, a "Deployed successfully" or "Verified" state, or a "Canceled" state, among other possibilities). The E-Release record 811 also can include one or more related record fields 827 having respective record identifiers for one or more respective related records. The E-Release record 811 also includes one or more related user fields 829 having respective user identifiers for one or more respective related users. For example, the E-Release record 811 includes three related user fields 829a, 829b and 829c. The first user field 829a can indicate the creator or owner of the record. The second user field 829b can indicate one or more engineers or computer programmers assigned to design, implement, enable, execute or facilitate the E-Release. The third user field 829c can indicate one or more managers or executives assigned to oversee or verify the E-Release.

It should be noted that any of the directly related records 808, 810 and 811 can themselves be associated with any number of other records and associated entities that the records represent such as, for example, development teams, management oversight group records, among others. These are examples of records that can be directly related to the records 808, 810 and 811 and indirectly related to the record 800.

Figure 10A:
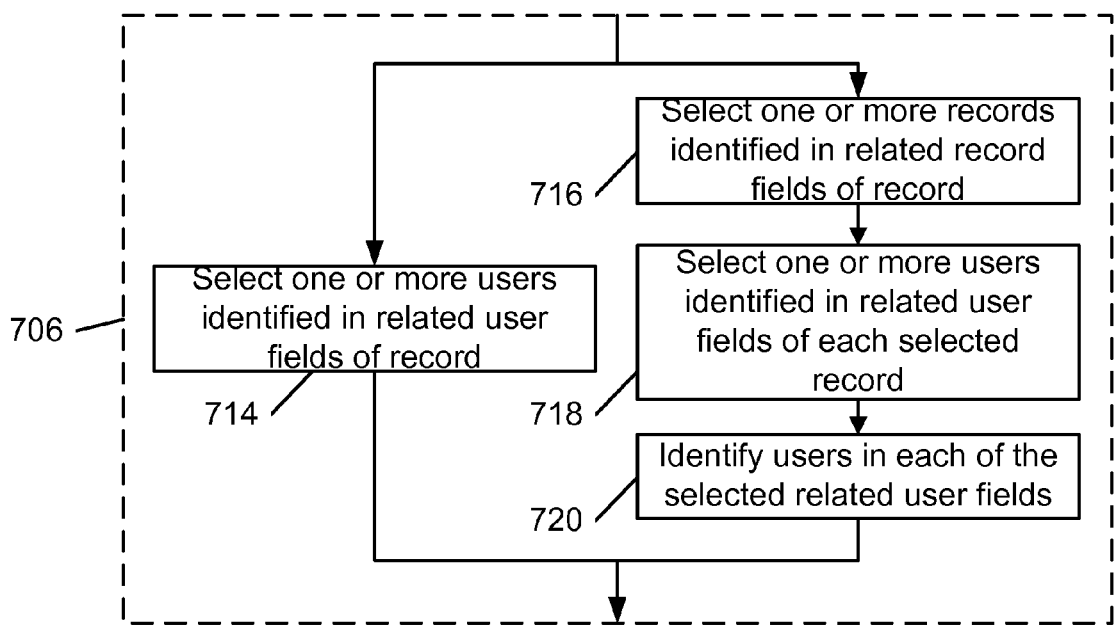
FIG. 10A shows a flowchart of an example computer-implemented method for identifying one or more users that are related to a record.

Continuing with the E-Release Request record example of FIG. 8, and referring back to the method 700 of FIG. 7, in some implementations, to identify the one or more users in the enterprise network that are related to the record 800 in block 706, the system parses the record 800 and selects, in sub-block 714, one or more of the users identified in the related user fields, as shown in FIG. 10A. For example, one or more of the related user fields 812a, 812b and 812c can be selected in sub-block 714. In some implementations, the related users selected in sub-block 714 are not only related to the record 800 for which the change in state was detected, but also are relevant to the new (current) status of the record because these selected users have a relationship with the current status of the record 800 as determined by the state of the state field 802, or a role in advancing the status from the current status to a next status, and correspondingly, a role in advancing the state of the record and what the record represents from a current state or stage to a next state or stage, as described above.

Additionally or alternatively, in some implementations, to identify the one or more users in the enterprise network that are related to the record 800 in block 706, the system further selects, in sub-block 716, one or more of the related records identified in the related record fields (for example, one or more of the related record fields 806a, 806b and 806c). Again, in some implementations, the related records selected in sub-block 716 are not only related to the record 800 for which the change in state was detected, but also are relevant to the new (current) status of the record because these selected records have a relationship with the current status of the record 800 as determined by the state of the state field 802, or a role in advancing the status from the current status to a next status, and correspondingly, a role in advancing the state of the record and what the record represents from a current state or stage to a next state or stage, as described above.

In some implementations, the system can automatically determine which related users to select in sub-block 714 and which related records to select in sub-block 716 based on the detected change in status according to a rule (or rule set) that can be previously input, selected or otherwise set by an owner of the record or administrator, or according to an algorithm that the system automatically determines in advance based on knowledge of the relationships between records and users of the enterprise network. In some implementations, once a rule set for one record, such as the E-Release Request record 800, is set by the owner of the record or otherwise determined for the record, the owner can select to save (or the system could automatically save) the rule set as a template for subsequent use with other records. For example, the rule set can then be automatically applied to other records such as other E-Release Requests to fix other defects in the same or a different application. In some implementations, a user creating a second E-Release Request can select a rule set from a menu, list or other Graphical User Interface (GUI) element or otherwise identify a rule set to apply to the record. In some other implementations, once the user creates the second E-Release request, the system can automatically determine, based on the type of record or other data associated with the record (such as a description of the record, a name of the record, or based on the other records or users selected or determined for the related record fields 806a, 806b or 806c or related user fields 812a, 812b or 812c) which rule set to apply to the record. The same or similar techniques can be used to automatically determine a rule set for other types of records such as accounts or opportunities. For example, in an account record example, a rule set can be configured into a core application that provides CRM product services. Users of that service can populate related user fields with, for example, users in a management hierarchy, or select groups related to the account record (such as selling teams). The system would then detect when the state field of the account state has reached certain statuses in which certain managers or selling team members should be subscribed to the account record.

In sub-block 718 the system accesses (or retrieves) the related records selected in sub-block 716 (for example, one or more of the related records 808, 810 and 811 associated with the Defect, Application and E-Release, respectively) and, for each of the selected related records, selects one or more of the one or more related user fields (for example: one or more of the related user fields 820a, 820b and 820c; one or more of the related user fields 828a, 828b and 828c; or one or more of the related user fields 829a, 829b and 829c) in the record data object for the selected related record. In sub-block 720, the system identifies the one or more user identifiers in each of the selected related user fields in the selected related record. As described above, in some implementations, the system can automatically determine which related users should be selected for each of the selected related records based on the detected change in status of the record 800 according to a rule set that can be previously input or set by the owner or an administrator, or according to an algorithm that the system automatically determines in advance based on knowledge of the relationships between records and users of the enterprise network or based on rule sets determined or saved for other records. Additionally or alternatively, the system can automatically determine which related users should be selected for each of the selected related records based on a status of the associated selected related record (for example, as indicated by state fields 816, 824, or 825) or based on a combination of such statuses (for example, based on a combination of the states in two or more of the state fields 802, 816, 824 and 825). In some implementations, the related users identified in sub-block 720 are not only related to the record 800 for which the change in state was detected, but also are relevant to the new (current) status of the record because these selected users have a relationship with the current status of the record 800 as determined by the state of the state field 802, or a role in advancing the status, as described above. Additionally or alternatively, the related users identified in sub-block 720 also can be identified or selected based on their relevance or relationship with the current status of the respective selected related record as well as the respective statuses of one or more other selected related records.

Additionally, in some implementations, a record, such as any of the records 800, 808, 810 or 811, can include two or more state fields. In some such implementations, the users selected for subscription to the record can be based on a combination of the two or more states within the record as well as based on a combination of these two or more states and the states of the selected related records.

Figure 10B:
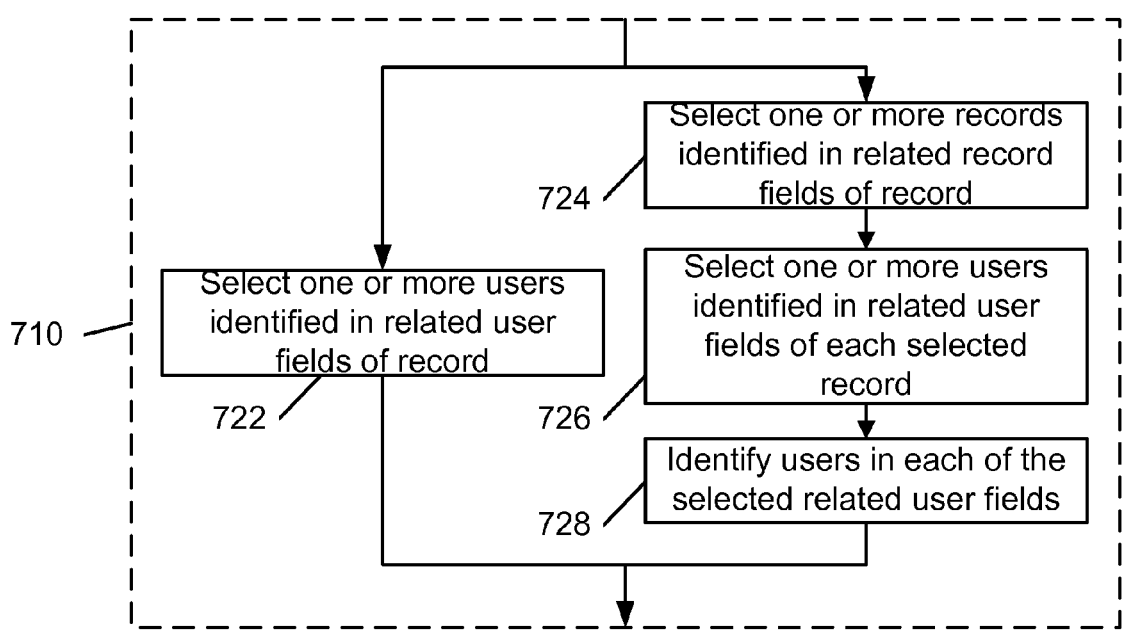
FIG. 10B shows a flowchart of an example computer-implemented method for identifying one or more users that are no longer related to a record.

Similarly, in some implementations, to identify the one or more previously subscribed users that are no longer currently relevant to the record 800 in block 710, the system parses the record 800 and selects, in sub-block 722, one or more of the related users identified in the related user fields, as shown in FIG. 10B. For example, one or more of the related user fields 812a, 812b and 812c can be selected in sub-block 722. For example, the system can automatically determine which related users to select in sub-block 722 based on the detected change in status according to a rule set that can be previously input, selected or set by the owner or an administrator, or according to an algorithm that the system automatically determines in advance based on knowledge of the relationships between records and users of the enterprise network.

Similarly, in some implementations, to identify the one or more previously subscribed users that are no longer currently relevant to the record 800 in block 710, the system further selects, in sub-block 724, one or more of the related records identified in the related record fields (for example, one or more of the related record fields 806a, 806b and 806c). Again, the system can automatically determine which related records to select in sub-block 724 based on the detected change in status according to a rule set that can be previously input, selected or set by the owner or an administrator, or according to an algorithm that the system automatically determines in advance based on knowledge of the relationships between records and users of the enterprise network. In sub-block 726 the system accesses (or retrieves) the related records selected in sub-block 724 (for example, one or both of the related records 808 and 810 associated with the Defect and Application, respectively) and, for each of the selected related records, selects one or more of the one or more related user fields (for example: one or more of the related user fields 820a, 820b and 820c; one or more of the related user fields 828a, 828b and 828c; or one or more of the related user fields 829a, 829b and 829c) in the record data object for the selected related record. In sub-block 728, the system identifies the one or more user identifiers in each of the selected related user fields in the selected related record. As described above, in some implementations, the system can automatically determine which related users should be selected for each of the selected related records based on the detected change in status according to a rule set that can be previously input, selected or set by the owner or an administrator, or according to an algorithm that the system automatically determines in advance based on knowledge of the relationships between records and users of the enterprise network.

As referenced above, FIG. 9 shows an example state diagram 900 for the possible states of the state field 802 of the E-Release Request record 800. There are eight possible transitions: an initial transition or assigning to the Pending state 950, a transition from Pending 950 to Rejected 952, a transition from Pending 950 to Approved 956, a transition from Pending 950 to Need-More-Information 954, a transition from Need-More-Information 954 to Rejected 952, a transition from Need-More-Information 954 to Approved 956, a transition from Need-More-Information 954 to Withdrawn 958, and a transition from Pending 950 to Withdrawn 958.

In some implementations, while the state field 802 of the record 800 is in the Pending state 950, it may be desirable for the system to subscribe only the users identified in the fields 812a and 812c, the creator of the request and the authorizer(s) of the release, respectively. In some such implementations, all other users are unsubscribed (unless they explicitly or actively subscribed to the record themselves) while the state field 802 of the record 800 is in the Pending state 950. In some implementations, while the state field 802 of the record 800 is in the Rejected state 952, it may be desirable for the system to unsubscribe all the users current subscribed to the record 800 because the E-Release Request has been rejected by the authorizer. In some implementations, while the state field 802 of the record 800 is in the Need-More-Information state 954, it may be desirable for the system to subscribe additional users beyond the creator and the authorizer(s) such that the authorizer(s) can obtain more information from various other users, for example, the creator of the request as well as some of the users identified in user fields 820a, 820b and 820c in the Defect record 808, the user fields 828a, 828b and 828c in the Application record 810, or the user fields 829a, 829b and 829c in the E-Release Record (if present or already associated). In some implementations, while the state field 802 of the record 800 is in the Approved state 956, it may be desirable for the system to subscribe only the users identified in the fields 812a and 812b, the creator of the request and the verifier of the release, respectively. In one such implementation, all other users are unsubscribed (unless they explicitly or actively subscribed to the record themselves) while the state field 802 of the record 800 is in the Approved state. In some implementations, while the state field 802 of the record 800 is in the Withdrawn state 958, it may be desirable for the system to unsubscribe all users.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A server-system-implemented method for associating users of an enterprise network to a record stored in a database of records, the method comprising:
    detecting, by a server system of a multi-tenant database system, a change in a status of a first record in a database of records of the multi-tenant database system, the first record including enterprise-related information, the first record having an associated state field having one of two or more possible states, each of the two or more states representing a respective status of the first record, the detection of the change in the status including detecting a change of the state in the state field; and
    in response to the detection of the change in the status:
        identifying, by the server system, one or more related users in the enterprise network that are currently relevant to the first record based on the change in the status, the identifying including:
            identifying one or more records in the database of records that are related to the first record; and
            identifying, for each of the one or more related records, one or more users in the enterprise network that are related to the respective related record; and
        subscribing, by the server system, each of the one or more related users to the first record.

2. The method of claim 1, further including, in response to the detection of the change in the status:
    identifying, by the server system, one or more users currently subscribed to the first record that are no longer relevant to the first record based on the change in the status; and unsubscribing each of the one or more no longer relevant currently subscribed users from the first record.

3. The method of claim 1, wherein:
each record in the database of records is stored as a respective record data object in the database;
each record data object includes a respective state field associated with the record;
each record data object further includes a record identifier field that identifies the record with a respective record identifier;
each record data object further includes one or more related record fields, each related record field having one or more record identifiers for one or more respective related records; and
identifying the one or more records in the database that are related to the first record includes:
accessing the record data object associated with the first record;
selecting one or more of the one or more related record fields in the record data object based on the change in the status;
accessing the one or more selected record fields; and
identifying one or more record identifiers in each of one or more of the selected record fields.

4. The method of claim 3, wherein each of the selected record fields is selected based on a current relevance of the respective selected record, the relevance of each of the respective selected records being associated with a relationship between information in the respective selected record and information in the first record.

5. The method of claim 3, wherein:
each user of the enterprise network is associated with a respective user identifier;
each record data object further includes one or more related user fields, each related user field having one or more user identifiers for one or more respective related users; and
identifying, for each of the one or more related records, the one or more users in the enterprise network that are related to the respective related record includes:
accessing the respective record data object associated with the respective related record;
selecting one or more of the one or more related user fields in the respective record data object based on the change in the status;
accessing the one or more selected user fields; and
identifying one or more user identifiers in each of one or more of the selected user fields.

6. The method of claim 5, wherein each of the selected user fields is selected based on a current relevance of the respective selected user, the relevance of each of the respective selected users being associated with a role of the respective selected user in developing or working with the first record in the first record's changed status or a role in transitioning the first record from the changed status to another status.

7. The method of claim 5, wherein each of the selected user fields is selected based on a status of the respective related record or a combination of the status of the first record and the status of the respective related record.

8. The method of claim 1, wherein:
each user of the enterprise network is associated with a respective user identifier;
each record data object further includes one or more related user fields, each related user field having one or more user identifiers for one or more respective related users; and
identifying the one or more related users in the enterprise network that are currently relevant to the first record based on the change in the status includes:
accessing the record data object associated with the first record;
selecting one or more of the one or more related user fields in the record data object;
accessing the one or more selected user fields; and
identifying one or more user identifiers in each of one or more of the selected user fields.

9. The method of claim 1, wherein the state field includes a picklist including two or more possible items, each item in the picklist representing a respective one of the two or more states.

10. The method of claim 1, wherein the two or more possible states are fixed.

11. The method of claim 1, wherein:
the change in the status is a change from a non-actionable status to an actionable status; and
the method further includes:
detecting a second change in the status of the first record, the second change in the status being a change from the actionable status to a non-actionable status; and
in response to the detection of the second change in the status, unsubscribing one or more of the users that were subscribed to the first record in response to the change in the status from the non-actionable status to the actionable status.

12. A system for associating users of an enterprise network to a record stored in a database of records, the system comprising:
a database system implemented using a server system including one or more processors and a database of records, the database system configurable to:
detect a change in a status of a first record in the database of records, the first record including enterprise-related information, the first record having an associated state field having one of two or more possible states, each of the two or more states representing a respective status of the first record, the detection of the change in the status including detecting a change of the state in the state field; and
in response to the detection of the change in the status:
identify one or more related users in the enterprise network that are currently relevant to the first record based on the change in the status, the identification including:
identifying one or more records in the database of records that are related to the first record; and
identifying, for each of the one or more related records, one or more users in the enterprise network that are related to the respective related record; and
subscribe each of the one or more related users to the first record.

13. The system of claim 12, wherein the database system is further configurable to, in response to the detection of the change in the status:
identify one or more users currently subscribed to the first record that are no longer relevant to the first record based on the change in the status; and
unsubscribe each of the one or more no longer relevant currently subscribed users from the first record.

14. The system of claim 12, wherein:
each record in the database of records is stored as a respective record data object in the database;

each record data object includes a respective state field associated with the record;

each record data object further includes a record identifier field that identifies the record with a respective record identifier;

each record data object further includes one or more related record fields, each related record field having one or more record identifiers for one or more respective related records; and identifying the one or more records in the database that are related to the first record includes:

accessing the record data object associated with the first record;

selecting one or more of the one or more related record fields in the record data object based on the change in the status;

accessing the one or more selected record fields; and identifying one or more record identifiers in each of one or more of the selected record fields.

15. The system of claim 14, wherein each of the selected record fields is selected based on a current relevance of the respective selected record, the relevance of each of the respective selected records being associated with a relationship between information in the respective selected record and information in the first record.

16. The system of claim 14, wherein:

each user of the enterprise network is associated with a respective user identifier;

each record data object further includes one or more related user fields, each related user field having one or more user identifiers for one or more respective related users; and identifying, for each of the one or more related records, the one or more users in the enterprise network that are related to the respective related record includes:

accessing the respective record data object associated with the respective related record;

selecting one or more of the one or more related user fields in the respective record data object based on the change in the status;

accessing the one or more selected user fields; and identifying one or more user identifiers in each of one or more of the selected user fields.

17. The system of claim 16, wherein each of the selected user fields is selected based on a current relevance of the respective selected user, the relevance of each of the respective selected users being associated with a role of the respective selected user in developing or working with the first record in the first record's changed status or a role in transitioning the record from the current status to another status.

18. The system of claim 16, wherein each of the selected user fields is selected based on a status of the respective related record or a combination of the status of the first record and the status of the respective related record.

19. The system of claim 12, wherein:

each user of the enterprise network is associated with a respective user identifier;

each record data object further includes one or more related user fields, each related user field having one or more user identifiers for one or more respective related users; and identifying the one or more related users in the enterprise network that are currently relevant to the first record based on the change in the status includes:

accessing the record data object associated with the first record;

selecting one or more of the one or more related user fields in the record data object;

accessing the one or more selected user fields; and identifying one or more user identifiers in each of one or more of the selected user fields.

20. The system of claim 12, wherein the state field includes a picklist including two or more possible items, each item in the picklist representing a respective one of the two or more states.

21. The system of claim 12, wherein the two or more possible states are fixed.

22. The system of claim 12, wherein:

the change in the status is a change from a non-actionable status to an actionable status; and the database system is further configurable to:

detect a second change in the status of the first record, the second change in the status being a change from the actionable status to a non-actionable status; and in response to the detection of the second change in the status, unsubscribe one or more of the users that were subscribed to the first record in response to the change in the status from the non-actionable status to the actionable status.

* * * * *